(No Model.)
L. RAWDON.
THILL COUPLING.
No. 557,604. Patented Apr. 7, 1896.
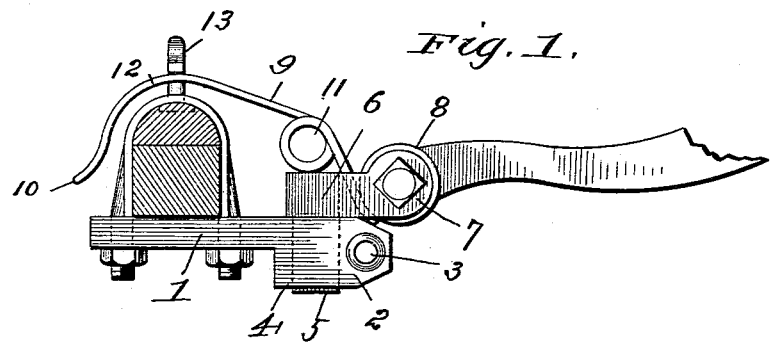
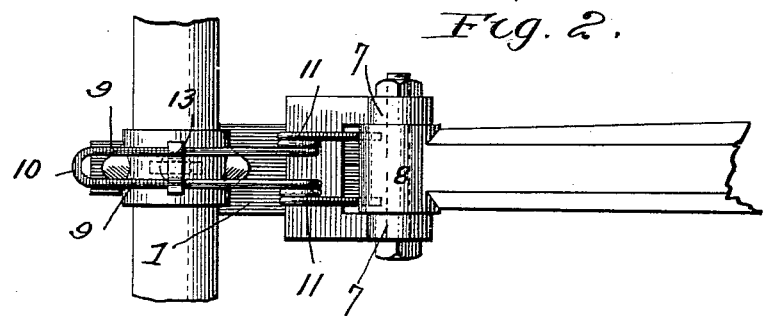
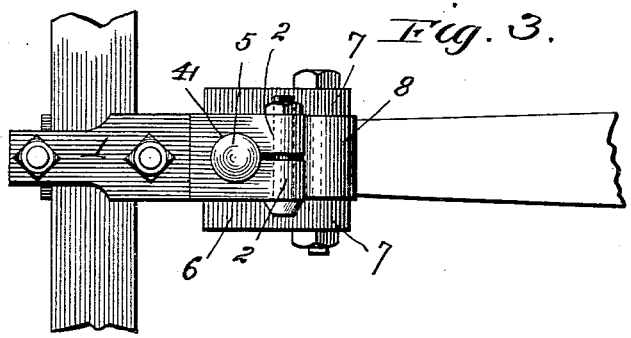
Witnesses
Inventor
Lucius Rawdon
By Alexander & Davis
Attorneys

UNITED STATES PATENT OFFICE.

LUCIEN RAWDON, OF WINDSOR, OHIO.

THILL-COUPLING.

SPECIFICATION forming part of Letters Patent No. 557,604, dated April 7, 1896.

Application filed September 5, 1895. Serial No. 561,583. (No model.)

*To all whom it may concern:*

Be it known that I, LUCIEN RAWDON, a citizen of the United States, residing at Windsor, in the county of Ashtabula and State of Ohio, have invented certain new and useful Improvements in Thill-Couplings, of which the following is a specification, reference being had therein to the accompanying drawings, in which—

Figure 1 is a side elevation, Fig. 2 a plan, and Fig. 3 a bottom view, of my improved thill-coupling.

This invention is designed to provide improved and simple means to prevent the thill-eye rattling, and also to provide simple means for detachably and adjustably securing the thill-carrying part to the axle-clip, as more fully hereinafter set forth.

It will be observed that the lower bar 1 of the axle-clip is extended forward and split vertically to form two clamping-jaws 2, connected at their forward ends by a horizontal bolt 3, said spring-jaws having formed between them a vertical hole or passage 4 for the reception of the cylindrical stem 5 of the part 6. The part 6 rests on top of the bar 1 and is provided with a pair of forwardly-extending ears 7, between which the thill-eye 8 is pivoted in the usual manner. It will be observed that by simply tightening the bolt 3 the stem of the part 6 may be rigidly clamped to the axle-clip, and that by loosening said bolt the thills may be adjusted vertically or rotatably or entirely removed.

The antirattler-spring consists of a pair of spring-arms 9 running approximately parallel and connected together at their rear ends at 10, the arms being preferably formed of a single piece of spring-wire. Each arm near its forward end is formed into a coil 11, which preferably rests upon the part 6 when the spring is in position, and the rear portion of the arms are curved downward, as at 12, so that they shall curve down over the axle when in position. A turn-button 13 is pivoted to the axle-clip on the upper side of the axle and is adapted to be passed between the parallel spring-arms and be turned around so as to engage over said arms and hold them down to the axle and thereby cause the forward ends of the arms to exert the required pressure on the thill-eye.

To apply the spring, it is simply necessary to insert the ends of the arms down behind the thill-eye until the coils rest upon the part 6, and then bend down the curved parts of the arms with one hand until the turn-button passes up between the arms, and then with the other hand turn the button parallel with the axle to lock the spring in place, as is obvious.

Having thus fully described my invention, what I claim is—

1. The combination of a bar adapted to be clipped to the axle, the forward end of said bar being split vertically to form two spring-jaws and having vertical passage between said jaws, a part 6 provided with a stem fitting in said vertical passage and having formed on it ears between which the thill-eye may be secured, substantially as described.

2. The combination of an axle-clip, a turn-button pivoted on the top thereof, a thill-eye connected to said clip and an antirattler-spring composed of two spring-arms extending down behind the thill-eye and being bent back over the axle, whereby the turn-button may engage the spring-arms and lock them down, substantially as described.

3. The combination of an axle-clip, a thill-eye secured thereto, a pair of connected spring-arms having their forward ends extending down behind the thill and their rear ends bent down under tension over the axle-clip, and a locking device carried by said clip and adapted to detachably hold the spring-arms down, substantially as described.

In testimony whereof I affix my signature in presence of two witnesses.

LUCIEN RAWDON.

Witnesses:
ALVIN C. WHITE,
E. C. WADE.